(12) United States Patent
Mougeotte et al.

(10) Patent No.: US 8,678,655 B1
(45) Date of Patent: Mar. 25, 2014

(54) REINFORCED SLEWING BEARING

(75) Inventors: Christopher Mougeotte, Wharton, NJ (US); David Geissler, Mount Arlington, NJ (US); Michael Hollis, Flanders, NJ (US); Nicholas Stolten, Bangor, PA (US); Justin John, Blauvelt, NY (US); Chris Cammack, Fredericksburg, VA (US); Thomas J. Kiel, Bernardsville, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 55 days.

(21) Appl. No.: 13/443,937

(22) Filed: Apr. 11, 2012

(51) Int. Cl.
*F16C 21/00* (2006.01)
*F16C 19/52* (2006.01)

(52) U.S. Cl.
USPC ............................ 384/126; 384/624; 384/609

(58) Field of Classification Search
USPC ......... 384/126–128, 624, 452–455, 447, 590, 384/609, 611, 615, 618–620, 622
See application file for complete search history.

(56) References Cited

U.S. PATENT DOCUMENTS

| 2,352,911 | A | * | 7/1944 | Osplack | 384/126 |
|---|---|---|---|---|---|
| 3,144,278 | A | * | 8/1964 | Pohler et al. | 384/493 |
| 3,393,022 | A | * | 7/1968 | Alven et al. | 384/127 |
| 3,445,146 | A | * | 5/1969 | Merritt et al. | 384/126 |
| 4,463,995 | A | * | 8/1984 | Andree | 384/620 |
| 4,881,828 | A | * | 11/1989 | Kato | 384/127 |
| 4,938,610 | A | * | 7/1990 | Kato | 384/126 |
| 5,441,350 | A | * | 8/1995 | Fujita | 384/447 |
| 6,176,620 | B1 | * | 1/2001 | Obara | 384/127 |
| 8,047,750 | B2 | * | 11/2011 | Mochizuki et al. | 409/231 |
| 8,459,872 | B2 | * | 6/2013 | Nies et al. | 384/126 |

* cited by examiner

*Primary Examiner* — Thomas R Hannon
(74) *Attorney, Agent, or Firm* — Henry S. Goldfine

(57) ABSTRACT

A bearing assembly for a first part that rotates with respect to a second part may include a slewing bearing having an axis of rotation and inner and outer races concentric with the axis of rotation. The inner race may be fixed to the first part and the outer race may be fixed to the second part. An inner, annular catch ring may be fixed to and adjacent to a lower surface of the inner race. An outer, annular catch ring may be fixed to and interposed between a lower surface of the outer race and the second part. A portion of the outer catch ring may be disposed below and adjacent to the lower surface of the inner race.

18 Claims, 3 Drawing Sheets

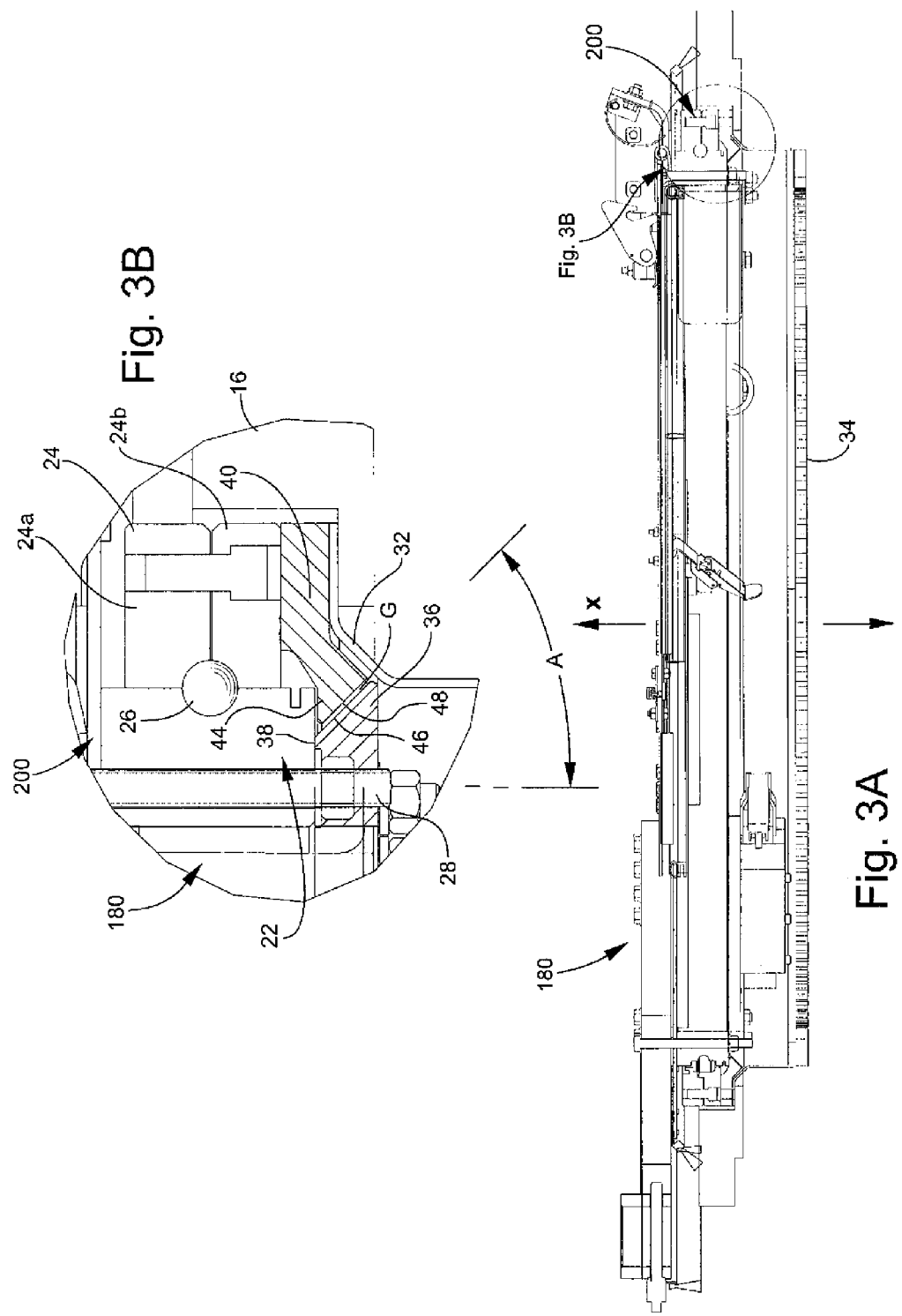

REINFORCED SLEWING BEARING

STATEMENT OF GOVERNMENT INTEREST

The inventions described herein may be manufactured, used and licensed by or for the U.S. Government for U.S. Government purposes.

BACKGROUND OF THE INVENTION

The invention relates in general to slewing bearings and in particular to slewing bearings that can withstand severe loads without separation.

Personnel transport vehicles may be equipped with a rotating turret. Examples of military personnel transport vehicles with rotating turrets include the High Mobility Multipurpose Wheeled Vehicle (HMMWV), the Mine Resistant Ambush Protected (MRAP), and the MRAP All-Terrain Vehicle (M-ATV). The rotating turret may be mounted to the inner race of a large slewing bearing. In some vehicles, the turret may include a gun, such as a .50 caliber machine gun, a sling seat for the gunner, and extra armor mounted on the turret or around the turret to protect the gunner. Because of the weight and size of the extra armor, the slewing bearing may separate during a catastrophic event, such as a vehicle rollover.

Manufacturers have produced large slewing bearings of various designs for cranes, excavators, windmills, and other heavy machinery. Special design considerations exist for stewing bearings for rotating turrets on military vehicles. The slewing bearing on a military vehicle needs to be blast-resistant. Ideally, the slewing bearing must be able to withstand severe loads and support protective armor while being lightweight in construction. The bearing must be able to withstand the transient impulse loads that result from traversing off-road environments. The off-road environments may be traversed at various speeds, and the bearing may experience impact and blast loads.

Yet, the bearing should be as lightweight as possible to minimize the additional weight on the vehicle's suspension. In the past, such slewing bearings have been constructed mostly of aluminum, which may be limited in both strength and stiffness. Because of the size and weight limitations of the slewing bearing in a personnel transport vehicle, the options for handling dynamic thrust loads are limited.

SUMMARY OF THE INVENTION

It is an object of the invention to provide a slewing bearing assembly for a personnel vehicle that can withstand large dynamic thrust loads.

One aspect of the invention is a bearing assembly for a first part that rotates with respect to a second part. The bearing assembly may include a slewing bearing having an axis of rotation and inner and outer races concentric with the axis of rotation. The inner race may be fixed to the first part and the outer race may be fixed to the second part. An inner, annular catch ring may be fixed to and adjacent to a lower surface of the inner race and concentric with the axis of rotation. An outer, annular catch ring may be fixed to and interposed between a lower surface of the outer race and the second part. The outer annular catch ring may be concentric with the axis of rotation. A portion of the outer catch ring may be disposed below and adjacent to the lower surface of the inner race.

The inner catch ring may include a circumferential, radially outermost surface that is angled inwardly with respect to the axis of rotation of the slewing bearing. The outer catch ring may include a circumferential, radially innermost surface that is substantially parallel to the radially outermost surface of the inner catch ring. The radially outermost surface of the inner catch ring and the radially innermost surface of the outer catch ring may define a gap there between. Upon deformation of the slewing bearing, the gap may close and the radially outermost surface of the inner ring may contact the radially innermost surface of the outer catch ring.

In one embodiment, the first part may be a rotating turret and the second part may be a body portion of a vehicle.

Another aspect of the invention is bearing assembly for a first part that rotates with respect to a second part. The bearing assembly may include a slewing bearing having an axis of rotation and inner and outer races concentric with the axis of rotation. The inner race may be fixed to the first part and the outer race may be fixed to the second part. The inner race may include a circumferential surface angled inwardly with respect to the axis of rotation and concentric with the axis of rotation. A portion of the outer race may extend radially inward and be juxtaposed below a portion of the inner race. The portion of the outer race may include a circumferential surface that is substantially parallel to the angled circumferential surface of the inner race.

The circumferential surfaces of the inner and outer races may define a gap there between. Upon deformation of the slewing bearing, the gap may close and the circumferential surface of the inner race may contact the circumferential surface of the outer race.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 3A is a cutaway side view of a turret with one embodiment of an augmented slewing bearing.

FIG. 3B is an enlarged view of a portion of FIG. 3A.

DETAILED DESCRIPTION OF THE PREFERRED EMBODIMENTS

A known slewing bearing may be strengthened by adding extra features to the bearing to create a reinforced or augmented slewing bearing. The augmented slewing bearing may be able to withstand the impulsive thrust loading encountered by a personnel vehicle during a roll over or a blast event.

The augmented slewing bearing may include a subassembly of two annular rings that nest one inside the other and mount on the underside or top of a known slewing bearing. The two rings may be an inner ring and an outer ring. In some embodiments, the inner and outer rings may meet at an angled interface. The angled interface may be similar to, for example, a dovetail joint. The two nested rings may be placed so that they capture a rotating turret. Separation of the turret from the vehicle may require that one or both of the nested rings shear off more than halfway around their circumference, or that all of the mounting bolts on at least one of the rings fail.

The outer ring may be mounted between the underside of an outer bearing race and a part of the vehicle, such as the roof of the vehicle. The inner ring may be mounted on the underside of the inner bearing race. Under normal loading conditions, there may be a clearance between the contact faces of the inner and outer rings so that the performance of the slewing bearing is not hindered in any way. Under significant thrust load, however, the slewing bearing may deflect to take up the load. Deflection of the slewing bearing may cause the inner and outer rings to come into contact. In this way, the inner and outer rings may augment the axial load carrying capacity of the slewing bearing. The axial load carrying capacity may require such augmentation during the dynamic thrust loading of a catastrophic event.

The inner and outer rings may be made of a material having a combination of high strength and high ductility. A material for the inner ring may be, for example, aluminum, steel or titanium. The relatively light weight of aluminum may minimize any increase in rotational inertia of the turret. Steel and titanium may provide additional strength. A material for the outer ring may be, for example, aluminum, steel or titanium. The material for the inner and outer rings may have a combination of high strength and high ductility. The choice of a specific material may depend on the specific application, design loads, and ring geometry.

Figure 1A:
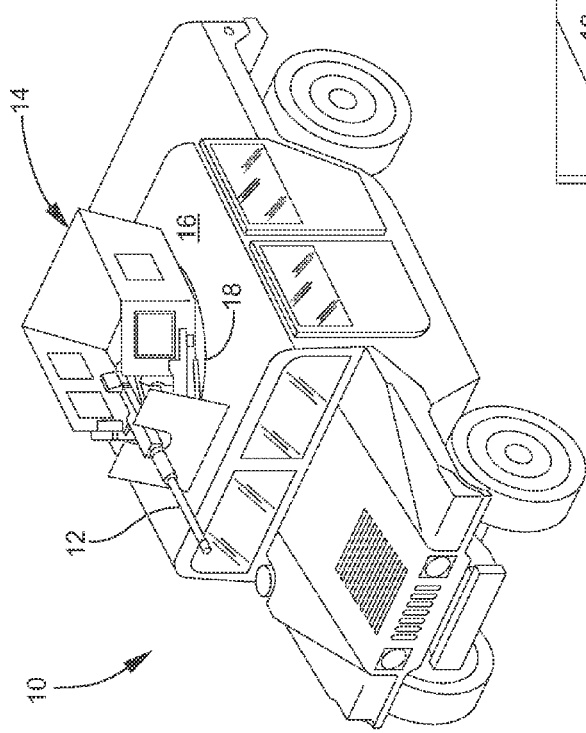
FIG. 1A is a perspective view of a personnel vehicle with a rotating turret.
Figure 1B:
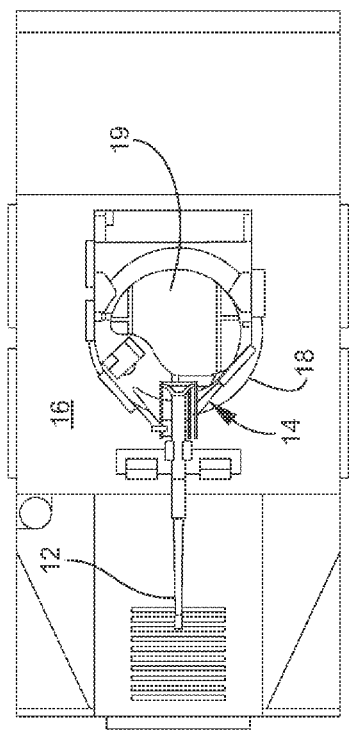
FIG. 1B is a top view of the vehicle of FIG. 1A.

FIG. 1A is a perspective view of a personnel vehicle 10 with a rotating turret 18. FIG. 1B is a top view of vehicle 10 of FIG. 1A. Rotating turret 18 may carry a weapon 12 and gunner protection armor 14. In some cases, armor 14 may be a retro-fitted assembly which adds significant weight to vehicle 10. Vehicle 10 may include a body portion 16, such as vehicle roof or top surface having an opening 19 therein. Turret 18 may be rotatably fixed to body portion 16 of vehicle 10.

Figure 2B:
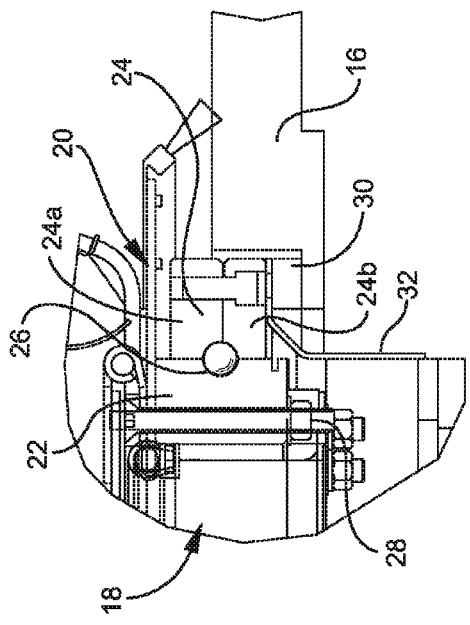
FIG. 2B is an enlarged view of a portion of FIG. 2A.
Figure 2A:
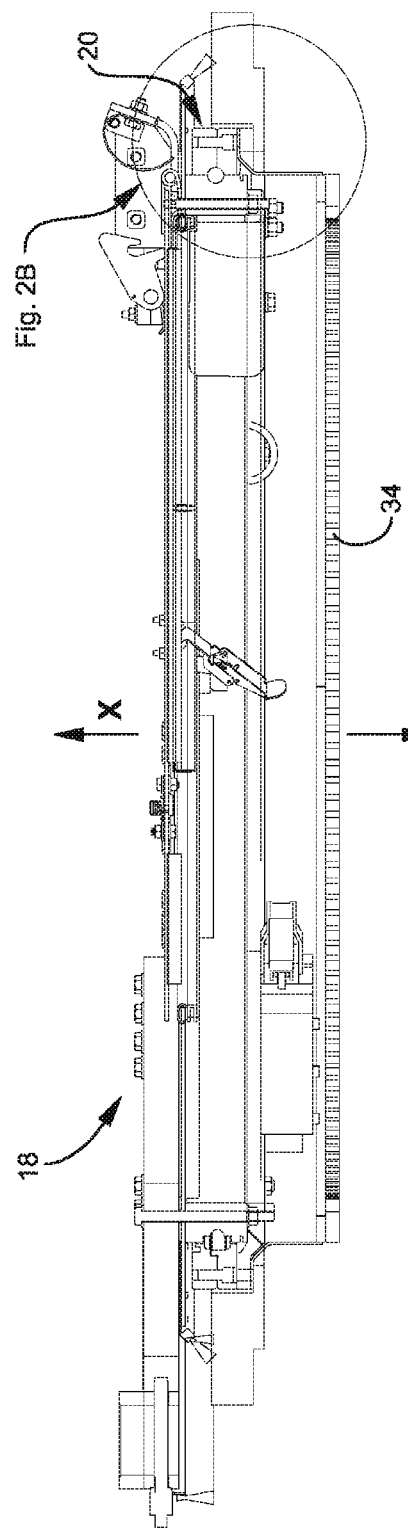
FIG. 2A is cutaway side view of a turret with a known slewing bearing.

FIG. 2A is a cutaway side view of turret 18 and a known slewing bearing 20. FIG. 2B is an enlarged view of a portion of FIG. 2A. Slewing bearing 20 may have an axis of rotation X and inner and outer races 22, 24 concentric with axis of rotation X. Outer race 24 may include upper and lower outer race portions 24a, 24b. A plurality of ball bearings 26 may be disposed between inner and outer races 22, 24. Inner race 22 may be fixed to turret 18 using, for example, fasteners 28. A spacer ring 30 may be disposed between body portion 16 of vehicle 10 and outer bearing race 24. In other embodiments, each of the inner race and the outer race of a known slewing bearing may have multiple portions or each may be a single monolithic piece. And, roller or rolling elements may be used in place of ball bearings.

A drive ring 32 may be fixed between spacer ring 30 and outer bearing race 24. Drive ring 32 may include gear teeth 34. Gear teeth 34 may mesh with an electric motor (not shown) to slew turret 18. Drive ring 32 may be disposed atop spacer ring 30. Spacer ring 30 may provide stiffness to bearing overall assembly. Spacer ring 30 may provide a flat surface to thereby level wavy body portion 16. Outer bearing race 24, drive ring 32, and spacer ring 30 may be fixed to body portion 16 using fasteners. For clarity, the fastener through holes in drive ring 32, spacer ring 30 and body portion 16 are not shown in FIG. 2B.

FIG. 3A is a cutaway side view of a turret 180 with one embodiment of a reinforced or augmented slewing bearing assembly 200. FIG. 3B is an enlarged view of a portion of FIG. 3A. Slewing bearing assembly 200 may have an axis of rotation X and inner and outer races 22, 24 concentric with axis of rotation X. Outer race 24 may include upper and lower outer race portions 24a, 24b. A plurality of ball bearings 26 may be disposed between inner and outer races 22, 24. Inner race 22 may be fixed to turret 180 using, for example, fasteners 28. FIGS. 3A and 3B show an exemplary structure for races 22, 24 and bearings 26. As is known in the art, other types of races and bearings may be used.

An inner, annular catch ring 36 (shown with section hatching for clarity) may be fixed to and adjacent to a lower surface 38 of inner race 22. Inner catch ring 36 may abut lower surface 38 of inner race 22. Inner catch ring 36 may be concentric with axis of rotation X. Inner catch ring 36 may be fixed to inner race 22 using, for example, fasteners 28. An outer, annular catch ring 40 (shown with section hatching for clarity) may be fixed to and interposed between a lower surface of outer race 24 and body portion 16 of vehicle 10. Outer catch ring 40 may be concentric with axis of rotation X.

A portion 44 of outer catch ring 40 may be disposed below and adjacent to lower surface 38 of inner race 22. Portion 44 of outer catch ring 40 may be juxtaposed to lower surface 38 of inner race 22. Portion 44 of outer catch ring 40 may abut lower surface 38 of inner race 22. Drive ring 32 may be disposed between body portion 16 and outer catch ring 40. Outer race 24, outer catch ring 40 and drive ring 32 may be fixed to body portion 16 using, for example, fasteners such as fasteners 28. For clarity, the fastener through holes in drive ring 32, outer catcher ring 40 and body portion 16 are not shown in FIG. 3B.

Inner catch ring 36 may include a radially outermost surface 46. Surface 46 may be angled inwardly with respect to axis of rotation X. Outer catch ring 40 may include a radially innermost surface 48. Surface 48 may be angled and may be substantially parallel to radially outermost surface 46 of inner catch ring 36. An angle A between axis of rotation X and radially outermost surface 46 of inner catch ring 36 may be in a range of about 30 to about 60 degrees. In some embodiments, angle A may be in range of about 40 to about 50 degrees.

Radially outermost surface 46 of inner catch ring 36 and radially innermost surface 48 of outer catch ring 40 may define a gap G there between. Smaller thrust loads may be adequately absorbed by inner and outer races 22, 24 and bearings 26. When a large thrust load is applied to turret 180, one or both of inner and outer races 22, 24 may deform. Deformation of one or both of races 22, 24 may cause gap G to narrow. If the deformation is large, gap G may close and radially outermost surface 46 of inner ring 36 may contact and bear on radially innermost surface 48 of outer catch ring 40. Contact of surfaces 46, 48 may augment the load carrying capacity of the assembly. If the thrust load is removed, gap G may widen and may return to its original width. The vertical motion of turret 180 may be constrained because outer catch ring 40 is captured between inner bearing race 22 and inner catcher ring 36.

Initial testing indicates that inner and outer catcher rings 36, 40 enable turret 180 to successfully endure otherwise catastrophic thrust loads.

While the invention has been described with reference to certain preferred embodiments, numerous changes, alterations and modifications to the described embodiments are possible without departing from the spirit and scope of the invention as defined in the appended claims, and equivalents thereof.

For example, those of skill in the art may ascertain that other geometries for the inner and outer rings may fit in the limited space in a turret. In one known turret, the available axial height for the inner and outer rings 36, 40 is only about 0.5 to about 1.0 inch. The invention may be incorporated into other slewing bearing functions where high axial shock loads occur, such as, for example, earth moving equipment, etc. Furthermore, inner and outer catch rings 36, 40 may be formed integrally with inner and outer races 22, 24, respectively.

What is claimed is:

1. A bearing assembly for a first part that rotates with respect to a second part, comprising:
   a slewing bearing having an axis of rotation and inner and outer races concentric with the axis of rotation, the inner race being fixed to the first part and the outer race being fixed to the second part;
   an inner, annular catch ring fixed to and adjacent to a lower surface of the inner race and concentric with the axis of rotation; and
   an outer, annular catch ring fixed to and interposed between a lower surface of the outer race and the second part, a portion of the outer catch ring being below and adjacent to the lower surface of the inner race, the outer annular catch ring being concentric with the axis of rotation.

2. The bearing assembly of claim 1, wherein the inner catch ring includes a radially outermost surface that is angled inwardly with respect to the axis of rotation of the slewing bearing and the outer catch ring includes a radially innermost surface that is substantially parallel to the radially outermost surface of the inner catch ring.

3. The bearing assembly of claim 2, wherein an angle between the axis of rotation and the
   radially outermost surface of the inner catch ring is in a range of about 30 to about 60 degrees.

4. The bearing assembly of claim 3, wherein the angle between the axis of rotation and the radially outermost surface of the inner catch ring is in a range of about 40 to about 50 degrees.

5. The bearing assembly of claim 2, wherein the radially outermost surface of the inner catch ring and the radially innermost surface of the outer catch ring define a gap there between.

6. The bearing assembly of claim 5, wherein, upon deformation of the slewing bearing, the gap closes and the radially outermost surface of the inner ring contacts the radially innermost surface of the outer catch ring.

7. The bearing assembly of claim 5, wherein the inner catch ring abuts the lower surface of the inner race and the portion of the outer catch ring below the lower surface of the inner race abuts the lower surface of the inner race.

8. The bearing assembly of claim 5, further comprising a drive ring interposed between the second part and the outer catch ring.

9. The bearing assembly of claim 8, wherein the first part is a rotating turret and the second
   part is a body portion of a personnel vehicle.

10. A method, comprising:
    providing the bearing assembly of claim 5;
    deforming the slewing bearing; and then
    narrowing the gap defined between the radially outermost surface of the inner catch ring and the radially innermost surface of the outer catch ring.

11. The method of claim 10, wherein narrowing the gap includes closing the gap such that the radially outermost surface of the inner catch ring contacts the radially innermost surface of the outer catch ring.

12. The method of claim 10, further comprising, after narrowing the gap, broadening the gap.

13. A bearing assembly for a rotating turret on a vehicle, comprising:
    a rotating turret disposed on a vehicle surface;
    a slewing bearing having an axis of rotation and inner and outer races concentric with the axis of rotation, the inner race being fixed to the rotating turret and the outer race being fixed to the vehicle surface;
    an inner catch ring fixed to and adjacent to a lower surface of the inner race;
    an outer catch ring fixed to and interposed between a lower surface of the outer race and the vehicle surface, a portion of the outer catch ring being below and adjacent to the lower surface of the inner race;
    the inner catch ring including a radially outermost surface that is angled inwardly with respect to the axis of rotation of the slewing bearing and the outer catch ring including a radially innermost surface that is substantially parallel to the radially outermost surface of the inner catch ring; and
    a gap defined between the radially outermost surface of the inner catch ring and the radially innermost surface of the outer catch ring;
    wherein, upon deformation of the slewing bearing, the gap closes and the radially outermost surface of the inner ring contacts the radially innermost surface of the outer catch ring.

14. The bearing assembly of claim 13, wherein an angle between the axis of rotation and the radially outermost surface of the inner catch ring is in a range of about 30 to about 60 degrees.

15. The bearing assembly of claim 14, wherein the angle between the axis of rotation and the radially outermost surface of the inner catch ring is in a range of about 40 to about 50 degrees.

16. The bearing assembly of claim 13, wherein the inner catch ring abuts the lower surface of the inner race and the portion of the outer catch ring below the lower surface of the inner race abuts the lower surface of the inner race.

17. The bearing assembly of claim 13, further comprising a drive ring interposed between the second part and the outer catch ring.

18. A vehicle, comprising:
    a rotating turret disposed on a vehicle surface;
    a slewing bearing having an axis of rotation and inner and outer races concentric with the axis of rotation, the inner race being fixed to the rotating turret and the outer race being fixed to the vehicle surface;
    an inner catch ring fixed to and adjacent to a lower surface of the inner race;
    an outer catch ring fixed to and interposed between a lower surface of the outer race and the vehicle surface, a portion of the outer catch ring being below and adjacent to the lower surface of the inner race;
    the inner catch ring including a radially outermost surface that is angled inwardly with respect to the axis of rotation of the slewing bearing and the outer catch ring including a radially innermost surface that is substantially parallel to the radially outermost surface of the inner catch ring; and
    a gap defined between the radially outermost surface of the inner catch ring and the radially innermost surface of the outer catch ring;
    wherein, upon deformation of the slewing bearing, the gap closes and the radially outermost surface of the inner ring contacts the radially innermost surface of the outer catch ring.

* * * * *